(12) United States Patent
Wu (10) Patent No.: US 11,564,143 B2
(45) Date of Patent: Jan. 24, 2023

(54) METHOD FOR CELL MANAGEMENT, TERMINAL, AND NETWORK-SIDE DEVICE

(71) Applicant: VIVO MOBILE COMMUNICATION CO., LTD., Chang'an Dongguan (CN)

(72) Inventor: Yumin Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 48 days.

(21) Appl. No.: 17/119,459

(22) Filed: Dec. 11, 2020

(65) Prior Publication Data

US 2021/0099939 A1    Apr. 1, 2021

Related U.S. Application Data

(63) Continuation of application No. PCT/CN2019/090654, filed on Jun. 11, 2019.

(30) Foreign Application Priority Data

Jun. 15, 2018  (CN) .......................... 201810623246.2

(51) Int. Cl.
*H04W 4/00* (2018.01)
*H04W 36/24* (2009.01)
*H04W 36/08* (2009.01)

(52) U.S. Cl.
CPC ........... *H04W 36/24* (2013.01); *H04W 36/08* (2013.01)

(58) Field of Classification Search
CPC . H04W 36/24; H04W 36/08; H04W 36/0061; H04W 24/02; H04W 36/36; H04W 16/18; H04W 36/00837; H04W 36/0085; H04W 36/20; H04L 41/0806; H04L 41/0803
(Continued)

(56) References Cited

U.S. PATENT DOCUMENTS 10,009,821 B2 *  6/2018  Futaki ............... H04W 36/0085
2010/0124203 A1   5/2010  Tenny et al.
(Continued)

FOREIGN PATENT DOCUMENTS

CN          1802006 A      7/2006
CN          101179843 A    5/2008
(Continued)

OTHER PUBLICATIONS

Notification of Reason for Refusal related to Korean Application No. 10-2021-7000281; dated Dec. 14, 2021.
(Continued)

*Primary Examiner* — Marcos Batista
(74) *Attorney, Agent, or Firm* — von Briesen & Roper, s.c.

(57) ABSTRACT

A method for cell management, a terminal, and a network-side device are provided. The method, applied to a terminal, includes: receiving configuration information sent by a network-side device, where the configuration information includes an evaluation period and a trigger condition for triggering the terminal to perform a cell management operation; and if the duration of satisfying the trigger condition is less than the evaluation period, skipping performing the cell management operation; and/or if the duration of satisfying the trigger condition is greater than or equal to the evaluation period, performing the cell management operation.

18 Claims, 5 Drawing Sheets

(58) Field of Classification Search
USPC .................................. 370/329, 331; 455/312
See application file for complete search history.

(56) References Cited

U.S. PATENT DOCUMENTS

| | | |
|---|---|---|
| 2010/0273487 A1 | 10/2010 | Alonso-Rubio et al. |
| 2012/0077502 A1 | 3/2012 | Liu |
| 2012/0276946 A1 | 11/2012 | Sung et al. |
| 2013/0072196 A1 | 3/2013 | Jung et al. |
| 2015/0189571 A1 | 7/2015 | Futaki |
| 2015/0271717 A1 | 9/2015 | Moon et al. |
| 2020/0022042 A1 | 1/2020 | Yin |

FOREIGN PATENT DOCUMENTS

| | | |
|---|---|---|
| CN | 101453770 A | 6/2009 |
| CN | 101715206 A | 5/2010 |
| CN | 102026232 A | 4/2011 |
| CN | 103096402 A | 5/2013 |
| CN | 106792569 A | 5/2017 |
| CN | 107889151 A | 4/2018 |
| CN | 110463261 A | 11/2019 |
| JP | 2012509619 A | 4/2012 |
| KR | 20110086623 A | 7/2011 |
| KR | 20120122765 A | 11/2012 |
| WO | 2014007337 A1 | 1/2014 |

OTHER PUBLICATIONS

Notification of Reason for Refusal related to Japanese Application No. 2020-567979; dated Feb. 2, 2022.
3rd Generation Partnership Project; Technical Specification Group Radio Access Network; Evolved Universal Terrestrial Radio Access (E-UTRA); Radio Resource Control (RRC); Protocol specification (Release 15), 3GPP TS 36.331 V15.0.1 (Jan. 2018).
Extended Search Report for related Application No. 19819109.0; dated Jul. 15, 2021.
International Search Report & Written Opinion related to Application No. PCT/CN2019/090654; dated Dec. 24, 2020.
First Chinese Office Action for related Application No. 201810623246.2; dated May 28, 2020.
Second Chinese Office Action for related Application No. 201810623246.2; dated Jan. 6, 2021.
Third Chinese Office Action for related Application No. 201810623246.2; dated May 26, 2021.
ETRI, "Simulation Results on Conditional Handover", May 21-25, 2018, 3GPP TSG-RAN WG2 Meeting #102, Busan, Korea.
ETRI, "Two FFSs on TTT", May 21-25, 2018, 3GPP TSG-RAN WG2 Meeting #102, Busan, Korea.

* cited by examiner

Send configuration information to a terminal, where the configuration information includes an evaluation time length and a trigger condition for triggering the terminal to perform a cell management operation  ⎯ 401

METHOD FOR CELL MANAGEMENT, TERMINAL, AND NETWORK-SIDE DEVICE

CROSS-REFERENCE TO RELATED APPLICATIONS

This application is continuation application of PCT International Application No. PCT/CN2019/090654 filed on Jun. 11, 2019, which claims priority to Chinese Patent Application No. 201810623246.2 filed in China on Jun. 15, 2018, the disclosures of which are incorporated in their entireties by reference herein.

TECHNICAL FIELD

This disclosure relates to the field of communications technologies, and in particular, to a method for cell management, a terminal, and a network-side device.

BACKGROUND

To improve efficiency of cell management, a cell may be managed in a condition-triggered manner. The management manner may include: addition, deletion, change or switching of cells.

A manner for conditional cell management means that a network-side device prepares one or more candidate target cells for a terminal in advance based on a measurement result reported by the terminal, and sends a conditional management command to the terminal. The conditional management command includes a list of candidate target cells, management trigger conditions corresponding to the candidate target cells, resource configurations corresponding to the candidate target cells, and the like. The terminal receives the conditional management command and performs a management operation on a candidate cell immediately after determining that the candidate cell satisfies a preset management trigger condition. This candidate cell may be viewed as a target cell. However, because channel quality such as measured Reference Signal Received Power (RSRP) changes relatively quickly, frequent cell management is likely to occur.

For example, during conditional handover (that is, Conditional Handover), the terminal immediately switches to the target cell after satisfying a handover trigger condition. However, because the channel quality such as the measured Reference Signal Received Power (RSRP) changes relatively quickly, it is possible that after the terminal switches to the target cell, signal quality of a source cell becomes good again, and the network-side device controls the terminal to switch back to the source cell, resulting in frequent cell handover such as ping-pong handover.

Obviously, frequent cell management operations caused by channel quality changes are a current technical problem that needs an urgent solution.

SUMMARY

This disclosure provides a method for cell management, a terminal, and a network-side device, to resolve the problem of frequent cell management operations caused by channel quality changes in the related art.

To resolve the foregoing problem, this disclosure is implemented as follows:

According to a first aspect, an embodiment of this disclosure provides a method for cell management, applied to a terminal, where the method includes:

receiving configuration information sent by a network-side device, where the configuration information includes an evaluation period and a trigger condition for triggering the terminal to perform a cell management operation; and if the duration of satisfying the trigger condition is less than the evaluation period, skipping performing the cell management operation; and/or if the duration of satisfying the trigger condition is greater than or equal to the evaluation period, performing the cell management operation.

According to a second aspect, an embodiment of this disclosure provides a method for cell management, applied to a network-side device, where the method includes:

sending configuration information to a terminal, where the configuration information includes an evaluation period and a trigger condition for triggering the terminal to perform a cell management operation.

According to a third aspect, an embodiment of this disclosure further provides a terminal, where the terminal includes:

a receiving module, configured to receive configuration information sent by a network-side device, where the configuration information includes an evaluation period and a trigger condition for triggering the terminal to perform a cell management operation; and a management module, configured to: if the duration of satisfying the trigger condition is less than the evaluation period, skip performing the cell management operation; and/or if the duration of satisfying the trigger condition is greater than or equal to the evaluation period, perform the cell management operation.

According to a fourth aspect, an embodiment of this disclosure further provides a network-side device, where the network-side device includes:

a sending module, configured to send configuration information to a terminal, where the configuration information includes an evaluation period and a trigger condition for triggering the terminal to perform a cell management operation.

According to a fifth aspect, an embodiment of this disclosure further provides a terminal, where the terminal includes a processor, a memory, and a computer program stored in the memory and capable of running on the processor, where when the computer program is executed by the processor, the steps of the foregoing method for cell management applied to a terminal are implemented.

According to a sixth aspect, an embodiment of this disclosure further provides a network-side device, where the network-side device includes a processor, a memory, and a computer program stored in the memory and capable of running on the processor, where when the computer program is executed by the processor, the steps of the foregoing method for cell management applied to a network-side device are implemented.

According to a seventh aspect, an embodiment of this disclosure further provides a computer-readable storage medium, where the computer-readable storage medium stores a computer program, and when the computer program is executed by a processor, the steps of the foregoing method for cell management applied to a terminal are implemented, or the steps of the foregoing method for cell management applied to a network-side device are implemented.

In the embodiments of this disclosure, the configuration information sent by the network-side device is received, where the configuration information includes the evaluation period and the trigger condition for triggering the terminal to perform a cell management operation; and if the duration of satisfying the trigger condition is less than the evaluation period, performing of the cell management operation is skipped; and/or if the duration of satisfying the trigger condition is greater than or equal to the evaluation period, the cell management operation is performed. Obviously, the terminal in the embodiments of this disclosure is allowed to perform the cell management operation only when the trigger condition is always satisfied in the evaluation period, reducing frequent cell management operations caused by channel quality changes.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may still derive other drawings from these accompanying drawings without creative efforts.

DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

The terms "first", "second", and the like in this specification and claims of this application are used to distinguish between similar objects rather than to describe a specific order or sequence. It should be understood that the numbers used in this way is interchangeable in appropriate circumstances so that the embodiments of this application described herein can be implemented in other orders than those illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or inherent to the process, method, system, product, or device. In addition, "and/or" used in this specification and claims indicates at least one of the connected objects. For example, "A and/or B and/or C" represents the following seven cases: only A; only B; only C; both A and B; both B and C; both A and C; and all A, B, and C.

For ease of understanding, the following describes some terms used in the embodiments of this disclosure.

Conditional Handover:

In the embodiments of this disclosure, a conditional handover process may include the following steps.

Step S1: A source node sends a handover request (or referred to as an HO Request) to one or more target nodes.

Figure 1:
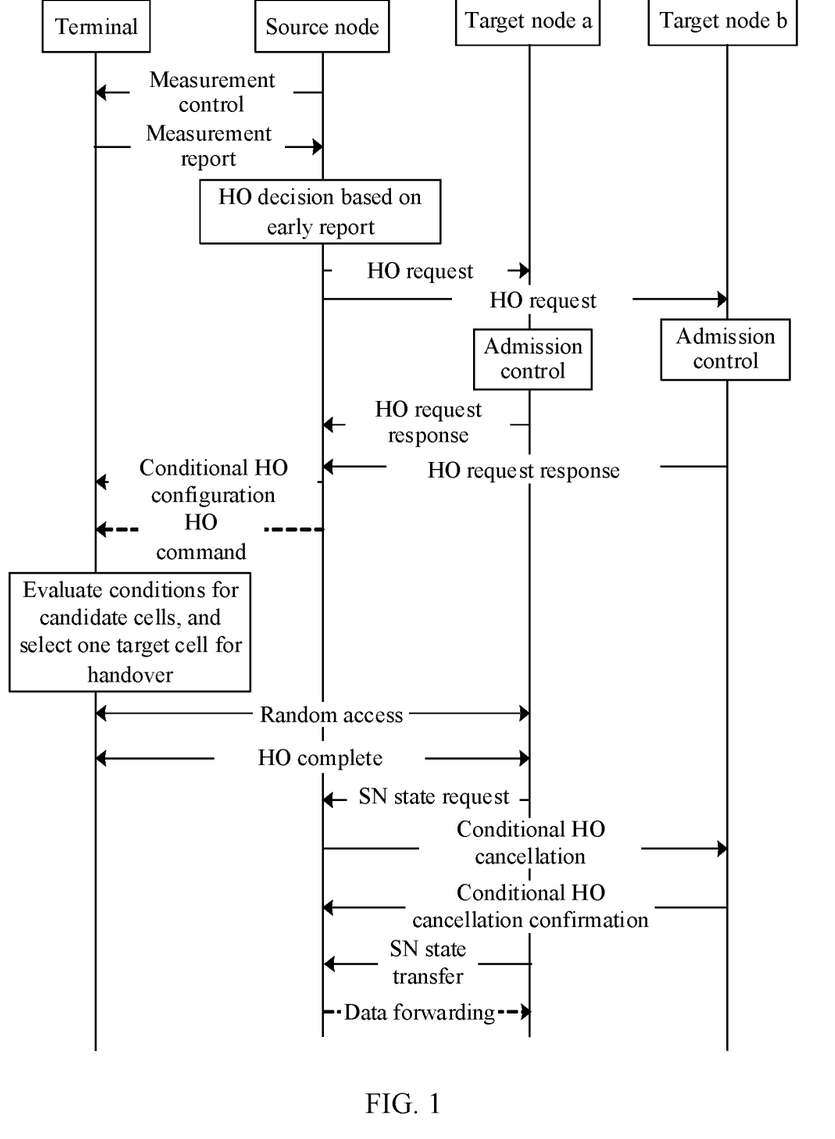
FIG. 1 is a flowchart of conditional handover in the prior art.

For example, in FIG. 1, a source node sends a handover request to a target node a and a target node b.

Step S2: The target node feeds back handover acknowledgment information, namely, a handover request response (HO Request ACK), to the source node.

As shown in FIG. 1, the target node a and the target node b each send a handover request response to the source node.

Step S3: The source node sends a conditional handover configuration (Conditional HO Configuration) to a terminal.

In this step, the source node sends conditional handover configuration information to the terminal, along with a configuration information reservation (that is, Resource Reservation).

Step S4: The terminal evaluates conditions for candidate cells, and selects one target cell for handover.

In this step, the terminal evaluates whether the conditions of the candidate cells are satisfied, and may select one target cell whose condition is satisfied for handover.

As shown in FIG. 1, the terminal may evaluate whether the conditions for the target node a and the target node b are satisfied, and when the terminal satisfies the condition for the target node a, the terminal may initiate a random access procedure to the target node a.

Step S5: The terminal initiates a random access procedure to the selected target cell.

It may be understood that the foregoing random access may include contention-free random access, contention-based random access (that is, Contention based Random Access), or the like.

As shown in FIG. 1, the terminal selects the target node a to initiate random access.

Step S6: The terminal sends handover complete information to the selected target node.

As shown in FIG. 1, the terminal sends handover complete information (that is, HO Complete) to the target node a.

Step S7: The source node sends a conditional handover cancellation command to another target node that is unselected.

As shown in FIG. 1, the source node sends a conditional handover cancellation command (that is, Conditional HO Cancellation) to the target node b.

Step S8: The another target node that is unselected sends a conditional handover cancellation confirmation command to the source node.

As shown in FIG. 1, the target node b sends the conditional handover cancellation command (namely, Conditional HO Cancellation Confirmation) to the source node.

Dual Connectivity:

In a 5th generation (5G) system, a terminal uses a Dual Connectivity (DC) architecture. The DC architecture includes two cell groups: a Master Cell Group (MCG) and a Secondary Cell Group (SCG). The MCG corresponds to Master Nodes (MNs) on a network side, and the SCG corresponds to Secondary Nodes (SNs) on the network side. The MCG includes a Primary Cell (PCell) and a Secondary Cell (SCell), and the SCG includes a Primary Secondary Cell (PSCell) and an SCell. The PCell and the PSCell may also be collectively referred to as Special Cells (SpCells).

Figure 2:
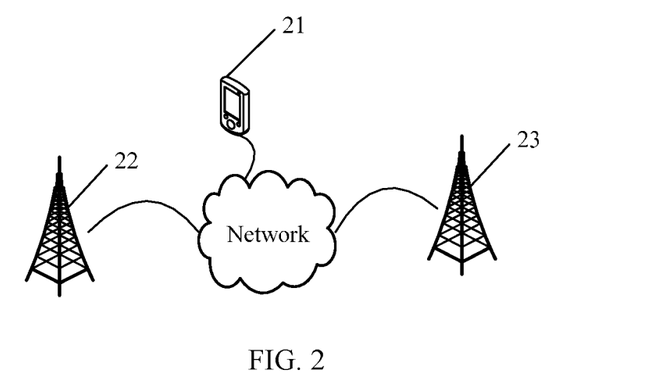
FIG. 2 is a structural diagram of a network system to which an embodiment of this disclosure may be applied.

FIG. 2 is a structural diagram of a network system to which an embodiment of this disclosure may be applied. As shown in FIG. 2, the network system includes a terminal 21, a source node 22, and a target node 23. The terminal 21, the source node 22 and the target node 23 can communicate with each other through a network.

In this embodiment of this disclosure, the terminal 21 may also be referred to as a terminal or user equipment (UE). The terminal 21 may be a terminal-side device such as a mobile phone, a tablet personal computer, a laptop computer, a personal digital assistant (PDA), a mobile internet device (MID), a wearable device, or a vehicle-mounted device. It should be noted that the terminal 21 is not limited to any specific type in this embodiment of this disclosure.

The source node 22 may be one of network nodes to which the terminal 21 is currently connected. For example, if the network nodes to which the terminal 21 is currently connected include an MN and an SN, the source node 22 may be one of the MN and the SN.

The target node 23 may be one of the network nodes to which the terminal 21 is currently connected, or may be a network node to which the terminal 21 is currently not connected. Because cell configuration performed by the terminal 21 may include at least one of cell addition, cell deletion, cell change and cell handover in this embodiment of this disclosure, the terminal 21 may establish a connection to the target node 23, delete a connection between the terminal 21 and the target node 23, or change configuration information of the target node 23, in a process of performing cell configuration.

In addition, a network structure applied in this embodiment of this disclosure may include one or more target nodes 23, and one target node 23 is illustrated as an example in the figure.

The network node may be a base station of 5G or a later release (for example, a 5G NR NB), or a base station in another communications system, or may be referred to as a NodeB, an evolved NodeB, or an MN, or an SN, or other terms in the field. As long as a same technical effect is achieved, the base station is not limited to any specific technical term.

The method for cell management in this embodiment of this disclosure may be applied to a conditional handover procedure. That is, the source node 22 and the target node 23 may be a source base station and a target base station in the conditional handover procedure. Alternatively, the method for cell management in this embodiment of this disclosure may be applied to a DC architecture. To be specific, the source node 22 and the target node 23 may be a source SN and a target SN in the DC architecture, or a source MN and a target SN in the DC architecture.

It should be noted that specific functions of the terminal 21, the source node 22, and the target node 23 in this embodiment of this disclosure are described in detail by using the following plurality of embodiments.

Figure 3:
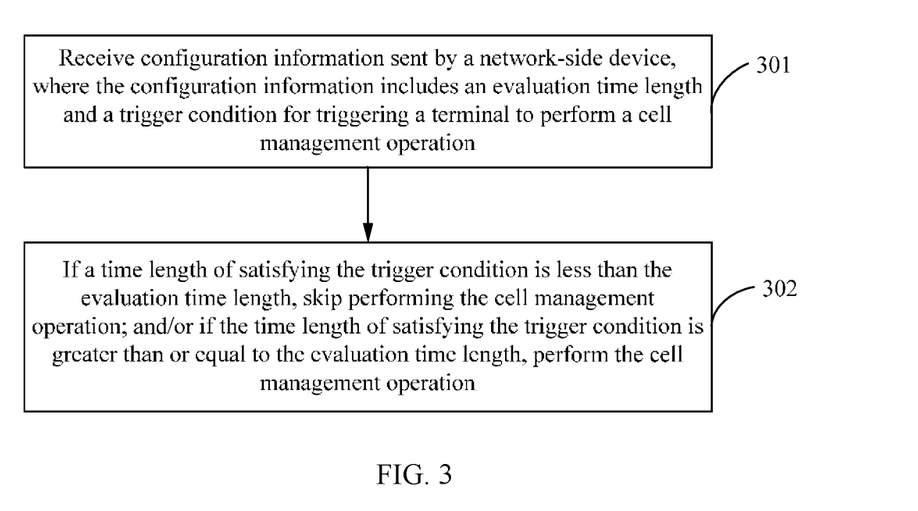
FIG. 3 is a first flowchart of a method for cell management according to an embodiment of this disclosure.

FIG. 3 is a first flowchart of a method for cell management according to an embodiment of this disclosure. The method for cell management in this embodiment is applied to a terminal. As shown in FIG. 3, the method for cell management in this embodiment includes the following steps.

Step 301: Receive configuration information sent by a network-side device, where the configuration information includes an evaluation period and a trigger condition for triggering a terminal to perform a cell management operation.

In this embodiment, the network-side device may send the configuration information by using a radio resource control (RRC) message. Certainly, this is not limited in this embodiment of this disclosure. For example, another downlink message may be used alternatively.

In this embodiment, the configuration information includes the evaluation period (or referred to as evaluation time interval information). The evaluation period is used to evaluate a duration of the trigger condition and indicates that the terminal is allowed to perform a cell management operation only when the trigger condition for triggering cell management is always satisfied in at least the evaluation time interval. A node that determines the evaluation period may be a source node or a target node that manages a cell, such as a source base station or a target base station in a handover procedure.

The trigger condition (or referred to as a trigger event, event) in the configuration information is used to indicate that the terminal can perform he cell management operation when satisfying the trigger condition. The cell management operations may include, but is not limited to, at least one of cell addition, cell deletion, cell change, and cell handover.

The trigger condition in the configuration information may include, but is not limited to, a threshold for triggering a cell management operation. Further, the trigger condition in the configuration information may also include measurement parameters for triggering a cell management operation. The measurement parameters may include, but are not limited to, RSRP, Reference Signal Received Quality (RSRQ), a Signal to Interference Plus Noise Ratio (SINR), and the like.

In actual application, the trigger condition may be measurement parameters of one or more cells. For example, a measurement result of the RSRP satisfies a network-configured threshold. For example, a measurement result of RSRP of a serving cell 1 is less than the threshold, and a measurement result of RSRP of a neighboring cell 2 is greater than the threshold.

It should be noted that the configuration information in this embodiment may include one or more trigger conditions. In a scenario in which the configuration information includes a plurality of trigger conditions, the trigger condition in step 301 may be understood as any one of the foregoing plurality of trigger conditions. In a scenario in which the configuration information includes only one trigger condition, the trigger condition in step 301 is the trigger condition.

In addition, there is a correspondence between trigger conditions and evaluation periods in foregoing configuration information. The trigger conditions and the evaluation periods may be in a one-to-one correspondence, a one-to-many correspondence, or a many-to-one correspondence. This may be specifically determined according to an actual requirement, and is not limited in this embodiment of this disclosure.

For example, after the terminal detects that a trigger condition configured by the network-side device is satisfied, the terminal may start to evaluate whether the trigger condition is always satisfied in an evaluation period corresponding to the trigger condition, and then perform step 302 based on an evaluation result.

It should be understood that the trigger condition included in the foregoing configuration information may be understood as identification information of the trigger condition (condition ID). In this way, the trigger condition may be identified by using the identification information of the trigger condition, or the trigger condition is associated with the evaluation period by using the identification information.

Certainly, for the trigger condition included in the foregoing configuration information, the configuration information may include only the trigger condition, or include not only the trigger condition, but also the identification information corresponding to the trigger condition.

Step 302: If the duration of satisfying the trigger condition is less than the evaluation period, skip performing the cell management operation; and/or if the duration of satisfying the trigger condition is greater than or equal to the evaluation period, perform the cell management operation.

In this embodiment, the terminal evaluates the trigger condition according to the received configuration information, evaluating whether the trigger condition in the configuration information is satisfied.

In a specific implementation, after receiving the configuration information, the terminal may perform a measurement operation corresponding to the trigger condition, and detect whether a measurement result of the measurement operation satisfies the trigger condition. For example, it is detected whether an RSRP value of a measurement result exceeds an RSRP threshold indicated by an event 1.

If it is detected that the measurement result satisfies the trigger condition, the terminal continues performing the measurement operation, and records a duration (or referred to as a duration) in which the measurement result satisfies the trigger condition, to compare this duration with the evaluation period.

If the duration of satisfying the trigger condition is less than the evaluation period, performing of the cell management operation is skipped, that is, the cell management operation is not performed; and/or if the duration of satisfying the trigger condition is greater than or equal to the evaluation period, performing of the cell management operation may be allowed. Therefore, the terminal does not perform any cell management operation in at least the evaluation period, reducing frequent cell management operations caused by channel quality changes.

In the method for cell management in this embodiment, the configuration information sent by the network-side device is received, where the configuration information includes the evaluation period and the trigger condition for triggering the terminal to perform a cell management operation; and if the duration of satisfying the trigger condition is less than the evaluation period, performing of the cell management operation is skipped; and/or if the duration of satisfying the trigger condition is greater than or equal to the evaluation period, the cell management operation is performed. Obviously, the terminal in the embodiments of this disclosure is allowed to perform the cell management operation only when the trigger condition is always satisfied in the evaluation period, reducing frequent cell management operations caused by channel quality changes.

In this embodiment of this disclosure, the terminal may record, in various ways, the duration of satisfying the trigger condition. Optionally, after reception of the configuration information sent by the network-side device, the method further includes:

if it is detected that the trigger condition is satisfied, starting a timer corresponding to the trigger condition, and if it is detected that the trigger condition is not satisfied, stopping the timer corresponding to the trigger condition.

To be specific, after starting the timer corresponding to the trigger condition, if it is detected that the trigger condition is not satisfied, the terminal stops the timer corresponding to the trigger condition.

Obviously, the timer corresponding to the trigger condition (or referred to as a condition evaluation timer, such as a time To Trigger Timer) may be started when the terminal detects that the trigger condition is satisfied, and stopped when the terminal detects that the trigger condition is not satisfied. In other words, during a running period of the timer corresponding to the trigger condition, the terminal always satisfies the trigger condition. Therefore, running duration of the timer corresponding to the trigger condition may be used to represent the duration of satisfying the trigger condition (or referred to as the duration length).

It should be noted that, for application scenarios in which two or more trigger conditions in the plurality of trigger conditions included in the configuration information are satisfied, the terminal may start different timers for different satisfied trigger conditions. For ease of understanding, an example in which a trigger condition 1 and a trigger condition 2 are satisfied is used for description. The terminal may respectively start a timer corresponding to the trigger condition 1 and a timer corresponding to the trigger condition 2. In addition, after the terminal performs a cell management operation corresponding to the trigger condition 1, the timer corresponding to the trigger condition 2 can be stopped, to reduce power consumption of the terminal.

In addition, in another implementation, the terminal may also record, in another manner, for example by starting the timer corresponding to the trigger condition, the duration length of satisfying the trigger condition.

In this embodiment, when a timing threshold of the timer corresponding to the trigger condition is greater than or equal to the evaluation period corresponding to the trigger condition, the terminal may determine, based on a result of determining whether the timer corresponding to the trigger condition expires, whether to perform the cell management operation. Specific descriptions are as follows:

Optionally, the if the duration of satisfying the trigger condition is less than the evaluation period, skipping performing the cell management operation; and/or if the duration of satisfying the trigger condition is greater than or equal to the evaluation period, performing the cell management operation may be specifically embodied as follows:

If the timer corresponding to the trigger condition is stopped before expiry, performing of the cell management operation is skipped; and/or if the timer corresponding to the trigger condition expires, the cell management operation is performed, where a timing threshold of the timer corresponding to the trigger condition is greater than or equal to the evaluation period.

It can be seen from the foregoing description that the terminal stops the timer corresponding to the trigger condition when detecting that the trigger condition is not satisfied. Therefore, if the timer corresponding to the trigger condition is stopped before expiry, it indicates that the duration length of satisfying the trigger condition is very likely to be less than the evaluation period, and the terminal may skip performing the cell management operation.

It should be noted that, for an application scenario in which the time threshold of the timer corresponding to the trigger condition is greater than the evaluation period, even if the timer of the terminal is stopped before expiry, running duration of the timer may still be greater than or equal to the evaluation period. However, in consideration that the problem to be resolved in the embodiments of this disclosure is how to reduce frequent cell management operations caused by channel quality changes, in this application scenario, the terminal may also skip performing the cell management operation, thereby further reducing the frequent cell management operations caused by channel quality changes.

If the timer corresponding to the trigger condition expires, indicating that the duration length of satisfying the trigger condition is greater than or equal to the evaluation period, performing of the cell management operation may be allowed.

In this way, the terminal may determine whether the timer corresponding to the trigger condition has expired, and the terminal is allowed to perform the cell management operation only when the timer corresponding to the trigger condition expires, thereby reducing frequent cell management operations caused by channel quality changes.

In this embodiment of this disclosure, to specify a management operation type for the terminal, optionally, the configuration information further includes N pieces of management information corresponding to the trigger condition, and the configuration information includes evaluation periods respectively corresponding to the N pieces of management information, where N is a positive integer.

The if the duration of satisfying the trigger condition is greater than or equal to the evaluation period, performing the cell management operation includes:

if the duration of satisfying the trigger condition is greater than or equal to an evaluation period corresponding to target management information in the N pieces of management information, performing, on a cell, a management operation corresponding to the target management information.

The management information is used to indicate the management operation type, and includes but is not limited to at least one of addition, deletion, change, and handover operations.

There is a correspondence between management information and evaluation periods. The management information and the evaluation periods may be in a one-to-one correspondence or a many-to-one correspondence. This may be specifically determined according to an actual requirement, and is not limited in this embodiment of this disclosure. For example, a trigger event 1 corresponds to management information 1 and management information 2. The management information 1 is a handover command to a target cell 1, and the management information 2 is a handover command to a target cell 2. In addition, the management information 1 corresponds to an evaluation period T1, and the management information 2 corresponds to an evaluation period T2. The evaluation period corresponding to the target management information may be embodied as the evaluation period T1 of the management information 1 corresponding to the trigger event 1.

In this embodiment, the if the duration of satisfying the trigger condition is less than the evaluation period, skipping performing the cell management operation; and/or if the duration of satisfying the trigger condition is greater than or equal to the evaluation period, performing the cell management operation may be embodied as follows:

if the duration of satisfying the trigger condition is less than an evaluation period corresponding to target management information in the N pieces of management information, skipping performing the management operation corresponding to the target management information on the cell; and/or if the duration of satisfying the trigger condition is greater than or equal to the evaluation period corresponding to the target management information, performing the management operation corresponding to the target management information on the cell.

For example, if the target management information indicates that the management operation type is handover, the terminal performs a handover operation on the cell, that is, switching to the cell.

It should be understood that if N is 1, the target management information is the management information corresponding to the trigger condition; or if N is a positive integer greater than 1, the target management information may be understood as any piece of management information corresponding to the trigger condition.

In this way, the terminal is allowed to perform, on the cell, the management operation corresponding to the target management information only when the duration of satisfying the trigger condition is greater than or equal to the evaluation period corresponding to the target management information, which can reduce frequent cell management operations caused by channel quality changes. In addition, performing the management operation corresponding to the target management information on the cell can improve accuracy of the management operation.

For the embodiment in which the configuration information further includes N pieces of management information corresponding to the trigger condition, and the configuration information includes evaluation periods respectively corresponding to the N pieces of management information, where N is a positive integer, optionally, after the receiving configuration information sent by a network-side device, the method further includes:

if it is detected that the trigger condition is satisfied, starting a timer corresponding to the target management information, and if it is detected that the trigger condition is not satisfied, stopping the timer corresponding to the target management information, where the if the duration of satisfying the trigger condition is greater than or equal to an evaluation period corresponding to target management information in the N pieces of management information, performing, on a cell, a management operation corresponding to the target management information includes:

if the timer corresponding to the target management information expires, performing, on the cell, the management operation corresponding to the target management information, where a timing threshold of the timer corresponding to the target management information is greater than or equal to the evaluation period corresponding to the target management information.

It should be noted that, the implementation of this embodiment is similar to the implementation of the embodiment of "if the trigger condition is satisfied, starting a timer corresponding to the trigger condition". Refer to the foregoing description of the embodiment of "if the trigger condition is satisfied, starting a timer corresponding to the trigger condition" for details which are not described herein again.

In addition, in actual application, for a scenario in which N is greater than 2, if it is detected that the trigger condition is satisfied, the terminal may start different timers for different management information, and may stop timers corresponding to other management information after the terminal performs, on the cell, a management operation corresponding to specific management information, thereby reducing power consumption of the terminal.

In this way, the terminal may determine whether the timer corresponding to the target management information has expired, and the terminal is allowed to perform, on the cell, the management operation corresponding to the target management information only when the timer corresponding to the target management information expires, thereby reducing frequent cell management operations caused by channel quality changes.

In this embodiment of this disclosure, to specify a managed target cell for the terminal, optionally, the configuration information further includes K cells corresponding to the trigger condition, and the configuration information includes evaluation periods respectively corresponding to the K cells, where K is a positive integer; and the if the duration of satisfying the trigger condition is greater than or equal to the evaluation period, performing the cell management operation includes:

if the duration of satisfying the trigger condition is greater than or equal to an evaluation period corresponding to a target cell in the K cells, performing a management operation on the target cell.

There is a correspondence between cells and evaluation periods. The cells and the evaluation periods may be in a one-to-one correspondence or a many-to-one correspondence. This may be specifically determined according to an actual requirement, and is not limited in this embodiment of this disclosure. For example, a to-be-evaluated-and-managed cell corresponding to the trigger event 1 includes a cell 1 or a cell 2, where the cell 1 corresponds to an evaluation period T3, and the cell 2 corresponds to an evaluation period T4. The evaluation period corresponding to the target cell may be embodied as the evaluation period T3 of the cell 1 corresponding to the trigger event 1.

In this embodiment, the if the duration of satisfying the trigger condition is less than the evaluation period, skipping performing the cell management operation; and/or if the duration of satisfying the trigger condition is greater than or equal to the evaluation period, performing the cell management operation may be embodied as follows:

if the duration of satisfying the trigger condition is less than an evaluation period corresponding to a target cell in the K cells, skipping performing the management operation on the target cell; and/or if the duration of satisfying the trigger condition is greater than or equal to the evaluation period corresponding to the target cell, performing the management operation on the target cell.

It should be understood that if K is 1, the target cell is the cell corresponding to the trigger condition; or if K is a positive integer greater than 1, the target cell may be understood as any cell corresponding to the trigger condition.

In this way, the terminal is allowed to perform the management operation on the target cell only when the duration of satisfying the trigger condition is greater than or equal to the evaluation period corresponding to the target cell, which can reduce frequent cell management operations caused by channel quality changes. In addition, performing the management operation on the target cell can make cell management objects more accurate.

For the embodiment in which the configuration information further includes K cells corresponding to the trigger condition, and the configuration information includes evaluation periods respectively corresponding to the K cells, where K is a positive integer, optionally, after the receiving configuration information sent by a network-side device, the method further includes:

if it is detected that the trigger condition is satisfied, starting a timer corresponding to the target cell, and if it is detected that the trigger condition is not satisfied, stopping the timer corresponding to the target cell, where the if the duration of satisfying the trigger condition is greater than or equal to an evaluation period corresponding to a target cell in the K cells, performing a management operation on the target cell includes:

if the timer corresponding to the target cell expires, performing the management operation on the target cell, where a timing threshold of the timer corresponding to the target cell is greater than or equal to the evaluation period corresponding to the target cell.

It should be noted that, the implementation of this embodiment is similar to the implementation of the embodiment of "if the trigger condition is satisfied, starting a timer corresponding to the trigger condition". Refer to the foregoing description of the embodiment of "if the trigger condition is satisfied, starting a timer corresponding to the trigger condition" for details which are not described herein again.

In addition, in actual application, for a scenario in which K is greater than 2, if it is detected that the trigger condition is satisfied, the terminal may start different timers for different cells, and may stop timers corresponding to other cells after the terminal performs a management operation corresponding to a specific cell, thereby reducing power consumption of the terminal.

In this way, the terminal may determine whether the timer corresponding to the target cell has expired, and the terminal is allowed to perform the management operation on the target cell only when the timer corresponding to the target cell expires, thereby reducing frequent cell management operations caused by channel quality changes.

It should be noted that various optional implementations described in the embodiments of this disclosure may be implemented in combination with each other or may be implemented alone, which is not limited in the embodiments of this disclosure.

For the embodiments implemented through mutual combination of the optional implementations, for ease of understanding, examples are described as follows:

Step 1: A network-side device configures configuration information of conditional cell management for UE, where content of the configuration information includes:

a trigger condition for triggering management of a target cell;

management information for managing the target cell after the condition is satisfied; and time interval information for evaluating the trigger condition.

The "trigger condition" may be that one or more cells satisfy a network-configured threshold. For example, a measurement result of a serving cell 1 is less than a threshold 1, and a measurement result of a neighboring cell 2 is greater than the threshold.

The "management information for managing the target cell" may be management information for changing from a source cell to the target cell, such as a handover command.

The "time interval information for evaluating the trigger condition" includes a combination of any one or more of the following:

evaluation time interval information corresponding to the trigger condition, such as an evaluation time interval of a trigger event 1;

evaluation time interval information of the configuration information corresponding to the trigger condition, where for example, the trigger event 1 corresponds to a plurality of pieces of configuration information, and configuration information 1 is a handover command of a target cell 1; and configuration information 2 is a handover command of a target cell 2, and the time interval information may be the evaluation time interval of the configuration information 1 corresponding to the trigger event 1; and evaluation time interval information of the cell corresponding to the trigger condition, where for example, a to-be-evaluated-and-switched cell corresponding to the trigger condition 1 includes a cell 1 or a cell 2, and the time interval information may be an evaluation time interval of a to-be-evaluated-and-switched cell 1 corresponding to the trigger event 1.

A node that determines the "time interval information for evaluating the trigger condition" may be a source node or a target node that manages the target cell, such as a source base station or a target base station in a handover procedure.

Step 2: Based on the configuration information in step 1, the UE evaluates the trigger condition and evaluates whether the network-configured trigger condition is satisfied, for example, evaluating whether the it is satisfied that "the measurement result of the serving cell 1 is less than the threshold 1 and the measurement result of the neighboring cell 2 is greater than the threshold". After the UE satisfies the network-configured trigger condition, the UE evaluates whether the trigger condition is always satisfied in a specific time interval, and if the trigger condition is always satisfied in the specific time interval, the UE executes the configuration information corresponding to the trigger condition. For example, if it is satisfied that "the measurement result of the serving cell 1 is less than the threshold 1 and the measurement result of the neighboring cell 2 is greater than the threshold" in a time T, the UE switches to the target cell 1.

Behavior of the UE includes a combination of any one or more of the following:

after the trigger condition is satisfied, starting a condition evaluation timer (such as a time To Trigger Timer);

during running of the condition evaluation timer, if the trigger condition is no longer satisfied, stopping the condition evaluation timer; and after the condition evaluation timer expires, executing the configuration information corresponding to the trigger condition, for example, executing a handover command for switching to the target cell 1.

The UE can start different condition evaluation timers for different trigger conditions.

The UE can start different condition evaluation timers for different target cells with one same trigger condition.

In addition, after the UE executes the configuration information corresponding to the trigger condition, the UE stops other condition evaluation timers.

The method for cell management in this embodiment includes at least the following improvement:

The evaluation time for condition-based triggering is introduced, and performing of the cell management operation is allowed only when the trigger condition for triggering cell management is always satisfied in the evaluation time interval.

In this way, using the method for cell management in this embodiment, the network-side device can control the UE to evaluate the time interval of the trigger condition, and is allowed to perform the cell management operation only when the trigger condition is always satisfied in the evaluation time interval, thereby reducing frequent cell management operations caused by channel quality changes and the like.

Figure 4:
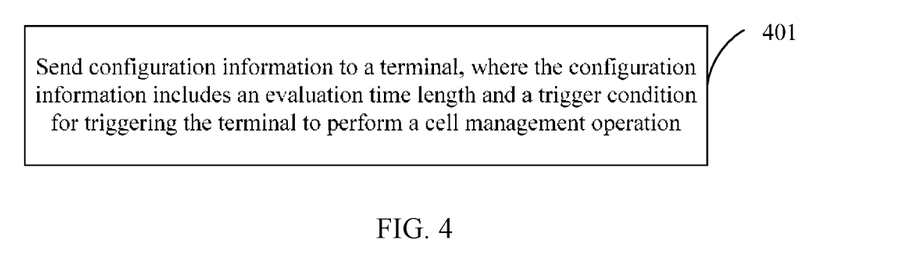
FIG. 4 is a second flowchart of a method for cell management according to an embodiment of this disclosure.

FIG. 4 is a second flowchart of a method for cell management according to an embodiment of this disclosure. The method for cell management in this embodiment is applied to a network-side device, and the network-side device may be a source node or a target node. As shown in FIG. 4, the method for cell management in this embodiment includes the following steps.

Step 401: Send configuration information to a terminal, where the configuration information includes an evaluation period and a trigger condition for triggering the terminal to perform a cell management operation.

Optionally, the configuration information further includes N pieces of management information corresponding to the trigger condition, and the configuration information includes evaluation periods respectively corresponding to the N pieces of management information, where N is a positive integer.

Optionally, the configuration information further includes K cells corresponding to the trigger condition, and the configuration information includes evaluation periods respectively corresponding to the K cells, where K is a positive integer.

It should be noted that this embodiment serves as an implementation of the method on the network side corresponding to foregoing method embodiment for the terminal side. Therefore, reference may be made to the related description in the foregoing method embodiment, and the same beneficial effects can be achieved. To avoid repetition, details are not described herein again.

Figure 5:
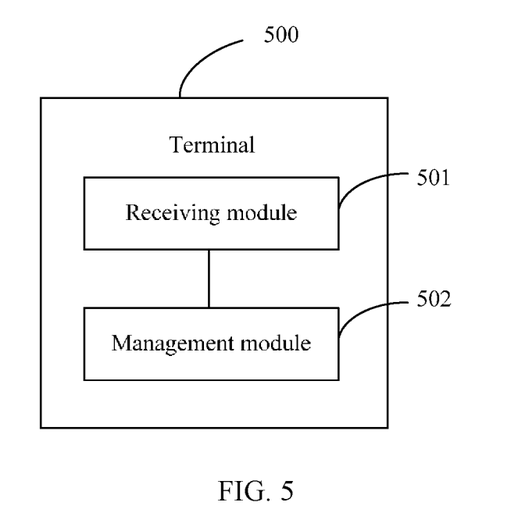
FIG. 5 is a first structural diagram of a terminal according to an embodiment of this disclosure.

FIG. 5 is a first structural diagram of a terminal according to an embodiment of this disclosure. As shown in FIG. 5, the terminal 500 includes:

a receiving module 501, configured to receive configuration information sent by a network-side device, where the configuration information includes an evaluation period and a trigger condition for triggering the terminal to perform a cell management operation; and a management module 502, configured to: if the duration of satisfying the trigger condition is less than the evaluation period, skip performing the cell management operation; and/or if the duration of satisfying the trigger condition is greater than or equal to the evaluation period, perform the cell management operation.

On a basis of FIG. 5, the following describes modules further included in the terminal 500.

A first control module is configured to: after reception of the configuration information sent by the network-side device, if it is detected that the trigger condition is satisfied, start a timer corresponding to the trigger condition, and if it is detected that the trigger condition is not satisfied, stop the timer corresponding to the trigger condition.

Optionally, the management module 502 is specifically configured to:

if the timer corresponding to the trigger condition is stopped before expiry, skip performing of the cell management operation; and/or if the timer corresponding to the trigger condition expires, perform the cell management operation, where a timing threshold of the timer corresponding to the trigger condition is greater than or equal to the evaluation period.

Optionally, the configuration information further includes N pieces of management information corresponding to the trigger condition, and the configuration information includes evaluation periods respectively corresponding to the N pieces of management information, where N is a positive integer.

The management module 502 is specifically configured to:

if the duration of satisfying the trigger condition is greater than or equal to an evaluation period corresponding to target management information in the N pieces of management information, perform, on a cell, a management operation corresponding to the target management information.

Optionally, the terminal 500 further includes:

a second control module, configured to: after reception of the configuration information sent by the network-side device, if it is detected that the trigger condition is satisfied, start a timer corresponding to the target management information, and if it is detected that the trigger condition is not satisfied, stop the timer corresponding to the target management information.

The management module 502 is specifically configured to:

if the timer corresponding to the target management information expires, perform, on the cell, the management operation corresponding to the target management information, where a timing threshold of the timer corresponding to the target management information is greater than or equal to the evaluation period corresponding to the target management information.

Optionally, the configuration information further includes K cells corresponding to the trigger condition, and the configuration information includes evaluation periods respectively corresponding to the K cells, where K is a positive integer.

The management module 502 is specifically configured to:

if the duration of satisfying the trigger condition is greater than or equal to an evaluation period corresponding to a target cell in the K cells, performing a management operation on the target cell.

Optionally, the terminal 500 further includes:

a third control module, configured to: after reception of the configuration information sent by the network-side device, if it is detected that the trigger condition is satisfied, start a timer corresponding to the target cell, and if it is detected that the trigger condition is not satisfied, stop the timer corresponding to the target cell.

The management module 502 is specifically configured to:

if the timer corresponding to the target cell expires, perform the management operation on the target cell, where a timing threshold of the timer corresponding to the target cell is greater than or equal to the evaluation period corresponding to the target cell.

The terminal 500 can implement the procedures in the method embodiments of this disclosure, with the same beneficial effects achieved. To avoid repetition, details are not described herein again.

Figure 6:
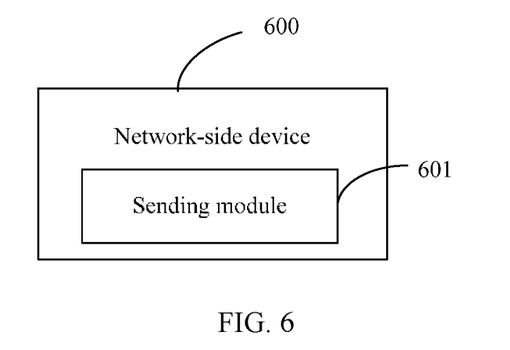
FIG. 6 is a first structural diagram of a network-side device according to an embodiment of this disclosure.

FIG. 6 is a first structural diagram of a network-side device according to an embodiment of this disclosure. As shown in FIG. 6, the network-side device 600 includes:

a sending module 601, configured to send configuration information to a terminal, where the configuration information includes an evaluation period and a trigger condition for triggering the terminal to perform a cell management operation.

Optionally, the configuration information further includes N pieces of management information corresponding to the trigger condition, and the configuration information includes evaluation periods respectively corresponding to the N pieces of management information, where N is a positive integer.

Optionally, the configuration information further includes K cells corresponding to the trigger condition, and the configuration information includes evaluation periods respectively corresponding to the K cells, where K is a positive integer.

The network-side device 600 can implement the procedures in the method embodiments of this disclosure, with the same beneficial effects achieved. To avoid repetition, details are not described herein again.

Figure 7:
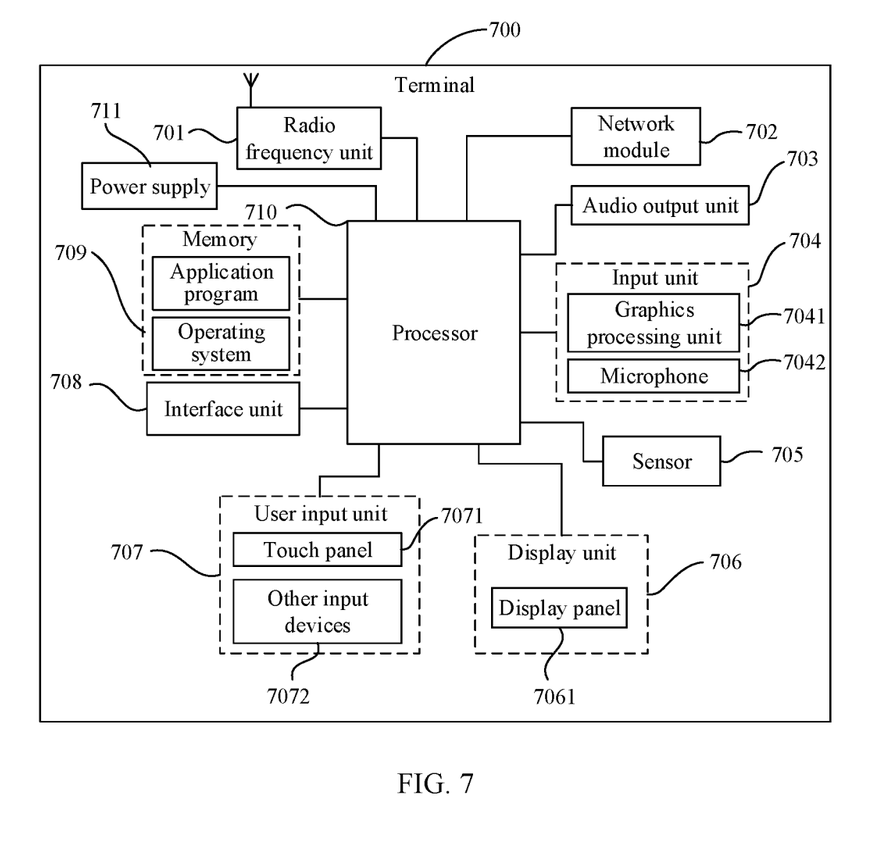
FIG. 7 is a second structural diagram of a terminal according to an embodiment of this disclosure.

FIG. 7 is a second structural diagram of a terminal according to an embodiment of this disclosure, that is, a schematic diagram of a hardware structure of the terminal in the embodiments of this disclosure. As shown in FIG. 7, the terminal 700 includes but is not limited to parts such as a radio frequency unit 701, a network module 702, an audio output unit 703, an input unit 704, a sensor 705, a display unit 706, a user input unit 707, an interface unit 708, a memory 709, a processor 710, and a power supply 711. A person skilled in the art may understand that the terminal structure shown in FIG. 7 does not constitute any limitation on the terminal. The terminal may include more or fewer components than those shown in the figure, or some components may be combined, or there may be a different component layout. In this embodiment of this disclosure, the terminal includes but is not limited to a mobile phone, a tablet computer, a notebook computer, a palmtop computer, an in-vehicle terminal, a wearable device, a pedometer, or the like.

The radio frequency unit 701 is configured to:

receive configuration information sent by a network-side device, where the configuration information includes an evaluation period and a trigger condition for triggering the terminal to perform a cell management operation.

The processor 710 is configured to:

if the duration of satisfying the trigger condition is less than the evaluation period, skip performing the cell management operation; and/or if the duration of satisfying the trigger condition is greater than or equal to the evaluation period, perform the cell management operation.

Optionally, the processor 710 is further configured to:

if it is detected that the trigger condition is satisfied, start a timer corresponding to the trigger condition, and if it is detected that the trigger condition is not satisfied, stop the timer corresponding to the trigger condition.

Optionally, if the timer corresponding to the trigger condition is stopped before expiry, performing of the cell management operation is skipped; and/or if the timer corresponding to the trigger condition expires, the cell management operation is performed, where a timing threshold of the timer corresponding to the trigger condition is greater than or equal to the evaluation period.

Optionally, the configuration information further includes N pieces of management information corresponding to the trigger condition, and the configuration information includes evaluation periods respectively corresponding to the N pieces of management information, where N is a positive integer.

The processor 710 is further configured to: if the duration of satisfying the trigger condition is greater than or equal to an evaluation period corresponding to target management information in the N pieces of management information, perform, on the cell, a management operation corresponding to the target management information.

Optionally, the processor 710 is further configured to:

if it is detected that the trigger condition is satisfied, start a timer corresponding to the target management information, and if it is detected that the trigger condition is not satisfied, stop the timer corresponding to the target management information, where if the timer corresponding to the target management information expires, perform, on a cell, the management operation corresponding to the target management information, where a timing threshold of the timer corresponding to the target management information is greater than or equal to the evaluation period corresponding to the target management information.

Optionally, the configuration information further includes K cells corresponding to the trigger condition, and the configuration information includes evaluation periods respectively corresponding to the K cells, where K is a positive integer. The processor 710 is further configured to: if the duration of satisfying the trigger condition is greater than or equal to an evaluation period corresponding to a target cell in the K cells, perform a management operation on the target cell.

Optionally, the processor 710 is further configured to:

if it is detected that the trigger condition is satisfied, start a timer corresponding to the target cell, and if it is detected that the trigger condition is not satisfied, stop the timer corresponding to the target cell, where if the timer corresponding to the target cell expires, perform the management operation on the target cell, where a timing threshold of the timer corresponding to the target cell is greater than or equal to the evaluation period corresponding to the target cell.

It should be noted that the foregoing terminal 700 in this embodiment is capable of implementing the procedures of the method embodiments in the embodiments of this disclosure, with the same beneficial effects achieved. To avoid repetition, details are not described herein again.

It should be understood that, in this embodiment of this disclosure, the radio frequency unit 701 may be configured to send or receive a signal in an information sending/receiving or call process. Specifically, the radio frequency unit 701 receives downlink data from a base station and sends the downlink data to the processor 710 for processing; and sends uplink data to the base station. Generally, the radio frequency unit 701 includes but is not limited to an antenna, at least one amplifier, a transceiver, a coupler, a low noise amplifier, a duplexer, and the like. In addition, the radio frequency unit 701 may further communicate with a network and other devices through a wireless communications system.

The terminal provides the user with wireless broadband internet access by using the network module 702, for example, helping the user send or receive an email, browse a web page, access streaming media, and the like.

The audio output unit 703 may convert audio data received by the radio frequency unit 701 or the network module 702 or stored in the memory 709 into an audio signal and output the audio signal as a sound. In addition, the audio output unit 703 may further provide audio output (for example, a call signal received sound or a message received sound) that is related to a specific function performed by the terminal 700. The audio output unit 703 includes a speaker, a buzzer, a telephone receiver, and the like.

The input unit 704 is configured to receive an audio or video signal. The input unit 704 may include a graphics processing unit (GPU) 7041 and a microphone 7042. The graphics processing unit 7041 processes image data of a static picture or a video that is obtained by an image capture apparatus (for example, a camera) in an image capture mode or a video capture mode. A processed image frame may be displayed on the display unit 706. An image frame processed by the graphics processing unit 7041 may be stored in the memory 709 (or another storage medium) or sent by the radio frequency unit 701 or the network module 702. The microphone 7042 can receive a sound and can process such sound into audio data. The processed audio data can be converted, for outputting, into a format that can be sent to a mobile communications base station through the radio frequency unit 701 in a telephone call mode.

The terminal 700 further includes at least one sensor 705, for example, an optical sensor, a motion sensor, and other sensors. Specifically, the optical sensor includes an ambient light sensor and a proximity sensor. The ambient light sensor may adjust luminance of a display panel 7061 based on intensity of ambient light. When the terminal 700 moves near an ear, the proximity sensor may disable the display panel 7061 and/or backlight. As a type of motion sensor, an accelerometer sensor can detect magnitudes of accelerations in all directions (usually three axes), can detect a magnitude and a direction of gravity when being static, and can be applied to terminal posture recognition (such as screen switching between portrait and landscape, related games, and magnetometer posture calibration), functions related to vibration recognition (such as pedometer and tapping), and the like. The sensor 705 may also include a fingerprint sensor, a pressure sensor, an iris sensor, a molecular sensor, a gyroscope, a barometer, a hygrometer, a thermometer, an infrared sensor, and the like. Details are not described herein.

The display unit 706 is configured to display information input by the user or information provided for the user. The display unit 706 may include a display panel 7061, and the display panel 7061 may be configured in the form of a liquid crystal display (LCD), an organic light-emitting diode (OLED), or the like.

The user input unit 707 may be configured to receive entered numerical or character information, and generate key signal input that is related to a user setting and function control of the terminal. Specifically, the user input unit 707 includes a touch panel 7071 and other input devices 7072. The touch panel 7071 is also referred to as a touchscreen, and may collect a touch operation of the user on or near the touch panel (for example, an operation performed on or near the touch panel 7071 by the user by using any appropriate object or accessory such as a finger or a stylus). The touch panel 7071 may include two parts: a touch detection apparatus and a touch controller. The touch detection apparatus detects a touch position of the user, detects a signal brought by a touch operation, and transmits the signal to the touch controller. The touch controller receives touch information from the touch detection apparatus, converts the touch information into point coordinates, and sends the point coordinates to the processor 710, and receives and executes a command sent by the processor 710. In addition, the touch panel 7071 may be implemented in a plurality of forms, for example, as a resistive, capacitive, infrared, or surface acoustic wave touch panel. The user input unit 707 may further include other input devices 7072 in addition to the touch panel 7071. Specifically, the other input devices 7072 may include but are not limited to a physical keyboard, a function key (such as a volume control key or a power on/off key), a trackball, a mouse, a joystick, and the like. Details are not described herein.

Further, the touch panel 7071 may cover the display panel 7061. After detecting a touch operation on or near the touch panel 7071, the touch panel 7071 transmits the touch operation to the processor 710 to determine a type of a touch event. Then the processor 710 provides corresponding visual output on the display panel 7061 based on the type of the touch event. In FIG. 7, the touch panel 7071 and the display panel 7061 serve as two independent components to implement input and output functions of the terminal. However, in some embodiments, the touch panel 7071 and the display panel 7061 may be integrated to implement the input and output functions of the terminal. This is not specifically limited herein.

The interface unit 708 is an interface for connecting a peripheral to the terminal 700. For example, the peripheral may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 708 may be configured to receive input (for example, data information and electric power) from the peripheral, and transmit the received input to one or more elements in the terminal 700; or may be configured to transmit data between the terminal 700 and the peripheral.

The memory 709 may be configured to store software programs and various data. The memory 709 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 709 may include a high-speed random access memory, or may further include a non-volatile memory, for example, at least one magnetic disk storage device, a flash memory device, or other volatile solid-state storage devices.

The processor 710 is a control center of the terminal, and is connected to all components of the terminal by using various interfaces and lines. By running or executing software programs and/or modules stored in the memory 709 and calling data stored in the memory 709, the processor 710 executes various functions of the terminal and processes data, so as to perform overall monitoring on the mobile terminal. The processor 710 may include one or more processing units. Optionally, the processor 710 may integrate an application processor and a modem processor. The application processor mainly processes an operating system, a user interface, an application program, and the like. The modem processor mainly processes wireless communication. It may be understood that the modem processor may alternatively not be integrated into the processor 710.

The terminal 700 may further include a power supply 711 (for example, a battery) that supplies power to all components. Optionally, the power supply 711 may be logically connected to the processor 710 through a power management system, to implement functions such as charging management, discharging management, and power consumption management by using the power management system.

In addition, the terminal 700 may include some functional modules that are not shown. Details are not described herein.

Optionally, an embodiment of this disclosure further provides a terminal, including a processor 710, a memory 709, and a computer program stored in the memory 709 and capable of running on the processor 710. When the computer program is executed by the processor 710, the procedures of the foregoing embodiments of the method for cell management are implemented, with the same technical effects achieved. To avoid repetition, details are not described again herein.

Figure 8:
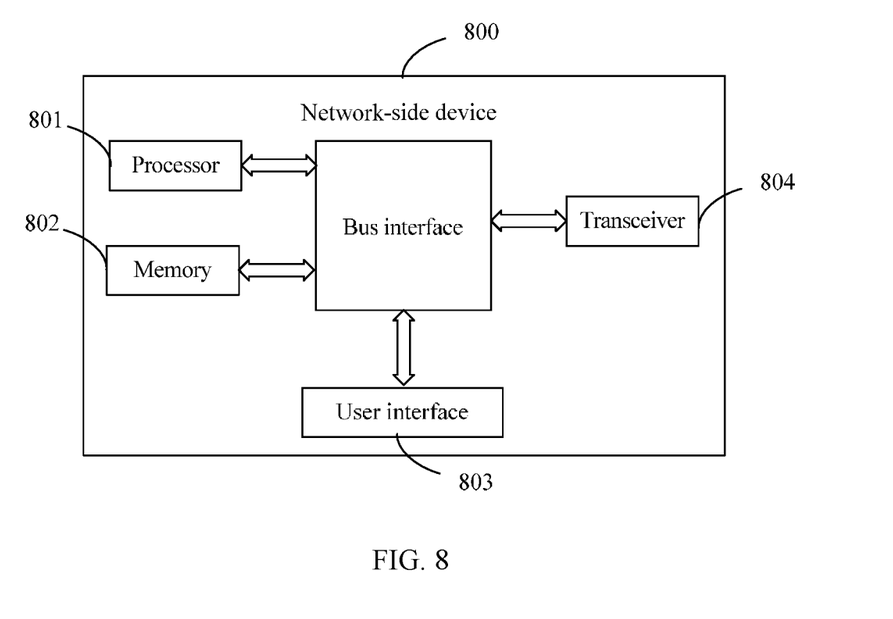
FIG. 8 is a second structural diagram of a network-side device according to an embodiment of this disclosure.

FIG. 8 is a second structural diagram of a network-side device according to an embodiment of this disclosure. As shown in FIG. 8, a network-side device 800 includes a processor 801, a memory 802, a user interface 803, a transceiver 804, and a bus interface.

The transceiver 804 is configured to:

send configuration information to a terminal, where the configuration information includes an evaluation period and a trigger condition for triggering the terminal to perform a cell management operation.

Optionally, the configuration information further includes N pieces of management information corresponding to the trigger condition, and the configuration information includes evaluation periods respectively corresponding to the N pieces of management information, where N is a positive integer.

Optionally, the configuration information further includes K cells corresponding to the trigger condition, and the configuration information includes evaluation periods respectively corresponding to the K cells, where K is a positive integer.

In FIG. 8, a bus architecture may include any quantity of interconnected buses and bridges, and specifically connect various circuits of one or more processors represented by the processor 801 and a memory represented by the memory 802. The bus architecture may further interconnect various other circuits such as a peripheral, a voltage regulator, and a power management circuit. These are all well known in the art, and therefore are not further described in this specification. A bus interface provides interfaces. The transceiver 804 may be a plurality of elements, including a transmitter and a receiver, and provides units configured to communicate with various other apparatuses over a transmission medium. For different user equipment, the user interface 803 may also be an interface for externally or internally connecting a required device, and the connected device includes but is not limited to a mini keyboard, a display, a speaker, a microphone, a joystick, or the like.

The processor 801 is responsible for management of the bus architecture and general processing, and the memory 802 may store data for use by the processor 801 during an operation.

The network-side device 800 is capable of implementing the procedures implemented by the network-side device in the foregoing method embodiments. To avoid repetition, details are not described herein again.

An embodiment of this disclosure further provides a computer-readable storage medium, where the computer-readable storage medium stores a computer program. When the computer program is executed by a processor, the procedures of the foregoing embodiments of the method for cell management are implemented, with the same technical effects achieved. To avoid repetition, details are not described again herein. For example, the computer-readable storage medium is a read-only memory (ROM for short), a random access memory (RAM for short), a magnetic disk, an optical disc, or the like.

It should be noted that in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by a phrase "includes a . . . " does not preclude the existence of other identical elements in the process, method, article, or apparatus that includes the element.

According to the description of the foregoing implementations, a person skilled in the art can clearly understand that the method in the foregoing embodiments may be implemented by software on a necessary universal hardware platform or by hardware only. In most cases, the former is a more preferred implementation. Based on such an understanding, the technical solutions of this disclosure essentially or a part thereof that contributes to the related art may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. A method for cell management, applied to a terminal and comprising:
   receiving configuration information sent by a network-side device, wherein the configuration information comprises an evaluation period and a trigger condition for triggering the terminal to perform a cell management operation; and
   if the duration of satisfying the trigger condition is less than the evaluation period, skipping performing the cell management operation; and/or if the duration of satisfying the trigger condition is greater than or equal to the evaluation period, performing the cell management operation;
   wherein, the cell management operation comprises at least one of cell addition, cell deletion, cell change, and cell handover;
   wherein the configuration information further comprises N pieces of management information corresponding to the trigger condition, and the configuration information comprises evaluation periods respectively corresponding to the N pieces of management information, wherein N is a positive integer; and
   if the duration of satisfying the trigger condition is greater than or equal to the evaluation period, performing the cell management operation comprises:
   if the duration of satisfying the trigger condition is greater than or equal to an evaluation period corresponding to target management information in the N pieces of management information, performing, on a cell, a management operation corresponding to the target management information.

2. The method according to claim 1, wherein after the receiving configuration information sent by a network-side device, the method further comprises:
   if it is detected that the trigger condition is satisfied, starting a timer corresponding to the trigger condition, and if it is detected that the trigger condition is not satisfied, stopping the timer corresponding to the trigger condition.

3. The method according to claim 2, wherein if the timer corresponding to the trigger condition is stopped before expiry, performing of the cell management operation is skipped; and/or if the timer corresponding to the trigger condition expires, the cell management operation is performed, wherein a timing threshold of the timer corresponding to the trigger condition is greater than or equal to the evaluation period.

4. The method according to claim 1, wherein after the receiving configuration information sent by a network-side device, the method further comprises:
   if it is detected that the trigger condition is satisfied, starting a timer corresponding to the target management information, and if it is detected that the trigger condition is not satisfied, stopping the timer corresponding to the target management information, wherein
   if the duration of satisfying the trigger condition is greater than or equal to an evaluation period corresponding to target management information in the N pieces of management information, performing, on a cell, a management operation corresponding to the target management information comprises:
   if the timer corresponding to the target management information expires, performing, on the cell, the management operation corresponding to the target management information, wherein a timing threshold of the timer corresponding to the target management information is greater than or equal to the evaluation period corresponding to the target management information.

5. The method according to claim 1, wherein the configuration information further comprises K cells corresponding to the trigger condition, and the configuration information comprises evaluation periods respectively corresponding to the K cells, wherein K is a positive integer; and
   if the duration of satisfying the trigger condition is greater than or equal to the evaluation period, performing the cell management operation comprises:
   if the duration of satisfying the trigger condition is greater than or equal to an evaluation period corresponding to a target cell in the K cells, performing a management operation on the target cell.

6. The method according to claim 5, wherein after the receiving configuration information sent by a network-side device, the method further comprises:
   if it is detected that the trigger condition is satisfied, starting a timer corresponding to the target cell, and if it is detected that the trigger condition is not satisfied, stopping the timer corresponding to the target cell, wherein
   if the duration of satisfying the trigger condition is greater than or equal to an evaluation period corresponding to a target cell in the K cells, performing a management operation on the target cell comprises:
   if the timer corresponding to the target cell expires, performing the management operation on the target cell, wherein a timing threshold of the timer corresponding to the target cell is greater than or equal to the evaluation period corresponding to the target cell.

7. A terminal, comprising a processor, a memory, and a computer program stored in the memory and capable of running on the processor, Wherein when the computer program is executed by the processor, a transceiver is configured to:
   receive configuration information sent by a network-side device, wherein the configuration information comprises an evaluation period and a trigger condition for triggering the terminal to perform a cell management operation; and
   the processor is configured to:
   if the duration of satisfying the trigger condition is less than the evaluation period, skip performing the cell management operation; and/or if the duration of satisfying the trigger condition is greater than or equal to the evaluation period, perform the cell management operation;
wherein, the cell management operation comprises at least one of cell addition, cell deletion, cell change, and cell handover;
Wherein, the configuration information further comprises N pieces of management information corresponding to the trigger condition, and the configuration information comprises evaluation periods respectively corresponding to the N pieces of management information, wherein N is a positive integer; and
the processor is further configured to:
if the duration of satisfying the trigger condition is greater than or equal to an evaluation period corresponding to target management information in the N pieces of management information, perform, on a cell, a management operation corresponding to the target management information.

8. The terminal according to claim 7, wherein the processor is further configured to:
if it is detected that the trigger condition is satisfied, start a timer corresponding to the trigger condition, and if it is detected that the trigger condition is not satisfied, stop the timer corresponding to the trigger condition.

9. The terminal according to claim 8, wherein if the timer corresponding to the trigger condition is stopped before expiry, performing of the cell management operation is skipped; and/or if the timer corresponding to the trigger condition expires, the cell management operation is performed, wherein a timing threshold of the timer corresponding to the trigger condition is greater than or equal to the evaluation period.

10. The terminal according to claim 7, wherein the processor is further configured to:
if it is detected that the trigger condition is satisfied, start a timer corresponding to the target management information, and if it is detected that the trigger condition is not satisfied, stop the timer corresponding to the target management information, wherein
if the timer corresponding to the target management information expires, perform, on the cell, the management operation corresponding to the target management information, wherein a timing threshold of the timer corresponding to the target management information is greater than or equal to the evaluation period corresponding to the target management information.

11. The terminal according to claim 7, wherein the configuration information further comprises K cells corresponding to the trigger condition, and the configuration information comprises evaluation periods respectively corresponding to the K cells, wherein K is a positive integer; and
the processor is further configured to:
if the duration of satisfying the trigger condition is greater than or equal to an evaluation period corresponding to a target cell in the K cells, perform a management operation on the target cell.

12. The terminal according to claim 11, wherein the processor is further configured to;
if it is detected that the trigger condition is satisfied, start a timer corresponding to the target cell, and if it is detected that the trigger condition is not satisfied, stop the timer corresponding to the target cell,
if the timer corresponding to the target cell expires, perform the management operation on the target cell, wherein a timing threshold of the timer corresponding to the target cell is greater than or equal to the evaluation period corresponding to the target cell.

13. A non-transitory computer-readable storage medium, wherein the computer-readable storage medium stores a computer program, wherein when the computer program is executed by a processor, the following steps are implemented:
receiving configuration information sent by a network-side device, wherein the configuration information comprises an evaluation period and a trigger condition for triggering the terminal to perform a cell management operation; and
if the duration of satisfying the trigger condition is less than the evaluation period, skipping performing the cell management operation; and/or if the duration of satisfying the trigger condition is greater than or equal to the evaluation period, performing the cell management operation;
wherein, the cell management operation comprises at least one of cell addition, cell deletion, cell change, and cell handover;
wherein the configuration information further comprises N pieces of management information corresponding to the trigger condition, and the configuration information comprises evaluation periods respectively corresponding to the N pieces of management information, wherein N is a positive integer; and
wherein when the computer program is executed by the processor, the following steps are implemented:
if the duration of satisfying the trigger condition is greater than or equal to an evaluation period corresponding to target management information in the N pieces of management information, performing, on a cell, a management operation corresponding to the target management information.

14. The non-transitory computer-readable storage medium according to claim 13, wherein when the computer program is executed by the processor, the following steps are father implemented:
if it is detected that the trigger condition is satisfied, starting a timer corresponding to the trigger condition, and if it is detected that the trigger condition is not satisfied, stopping the timer corresponding to the trigger condition.

15. The non-transitory computer-readable storage medium according to claim 14, wherein when the computer program is executed by the processor, the following steps are further implemented:
if the tinier corresponding to the trigger condition is stopped before expiry, performing of the cell management operation is skipped; and/or if the timer corresponding to the trigger condition expires, the cell management operation is performed, wherein a timing threshold of the timer corresponding to the trigger condition is greater than or equal to the evaluation period.

16. The non-transitory computer-readable storage medium according to claim 13, wherein when the computer program is executed by the processor, the following steps are further implemented:
if it is detected that the trigger condition is satisfied, starting a timer corresponding to the target management information, and if it is detected that the trigger condition is not satisfied, stopping the timer corresponding to the target management information, wherein if the timer corresponding to the target management information expires, performing, on the cell, the management operation corresponding to the target management information, wherein a timing threshold of the timer corresponding to the target management information is greater than or equal to the evaluation period corresponding to the target management information.

17. The non-transitory computer-readable storage medium according to claim 13, wherein the configuration information further comprises K cells corresponding to the trigger condition, and the configuration information comprises evaluation periods respectively corresponding to the K cells, wherein K is a positive integer; and wherein when the computer program is executed by the processor, the following steps are further implemented:

if the duration of satisfying the trigger condition is greater than or equal to an evaluation period corresponding to a target cell in the K cells, performing a management operation on the target cell.

18. The non-transitory computer-readable storage medium according to claim 17, wherein when the computer program is executed by the processor, the following steps are further implemented:

if it is detected that the trigger condition is satisfied, starting a timer corresponding to the target cell, and if it is detected that the trigger condition is not satisfied, stopping the timer corresponding to the target cell, if the timer corresponding to the target cell expires, performing the management operation on the target cell, wherein a timing threshold of the timer corresponding to the target cell is greater than or equal to the evaluation period corresponding to the target cell.

* * * * *